US005619515A

United States Patent [19]

Hayama

[11] Patent Number: 5,619,515

[45] Date of Patent: Apr. 8, 1997

[54] ON-VEHICLE ELECTRONIC APPARATUS

[75] Inventor: Akira Hayama, Kawagoe, Japan

[73] Assignee: Pioneer Electronic Corporation, Tokyo-to, Japan

[21] Appl. No.: 360,431

[22] Filed: Dec. 21, 1994

[30] Foreign Application Priority Data

Dec. 24, 1993 [JP] Japan .................................... 5-328780

[51] Int. Cl.$^6$ ........................................ H04B 3/60

[52] U.S. Cl. ........................................ 371/48; 381/86

[58] Field of Search .......................... 371/48, 49.1, 57.1, 371/57.2; 381/86; 455/345, 349

[56] References Cited

U.S. PATENT DOCUMENTS

| | | | |
|---|---|---|---|
| 4,715,031 | 12/1987 | Crawford et al. | 370/85.6 |
| 4,862,371 | 8/1989 | Maekawa | 364/431.11 |
| 5,086,510 | 2/1992 | Guenther et al. | 455/90 |
| 5,109,420 | 4/1992 | Nonaka | 381/86 |
| 5,222,107 | 6/1993 | Malville et al. | 375/356 |
| 5,349,326 | 9/1994 | Yamada | 340/426 |
| 5,351,041 | 9/1994 | Ikata et al. | 340/825.24 |
| 5,363,122 | 11/1984 | Suenaga et al. | 345/212 |
| 5,418,526 | 5/1995 | Crawford | 340/825.06 |
| 5,442,170 | 8/1995 | Kreft et al. | 250/229 |
| 5,454,001 | 9/1995 | Nagatani et al. | 371/68.2 |
| 5,459,660 | 10/1995 | Berra | 364/424.03 |

*Primary Examiner*—Stephen M. Baker
*Attorney, Agent, or Firm*—Young & Thompson

[57] ABSTRACT

An on-vehicle electronic apparatus is provided with: a main body unit fixed with respect to a vehicle and having a first clock generation device for generating a clock for synchronization in the main body unit, a first shift register for taking in data and a first controller for controlling transmission and reception of the data at the main body unit; and an operation and display unit detachably mounted on the main body unit and having a second clock generation device for generating a clock for synchronization in the operation and display unit, a second shift register for taking in data and a second controller for controlling transmission and reception of the data at the operation and display unit, wherein the transmission and reception of the data between the main body unit and the operation and display unit are established through just two transmission lines, one of which is for transmission from the operation and display unit to the main body unit and the other of which is for transmission from the main body unit to the operation and display unit.

11 Claims, 8 Drawing Sheets

ON-VEHICLE ELECTRONIC APPARATUS

BACKGROUND OF THE INVENTION

1. Field of the Invention

The present invention generally relates to an on-vehicle electronic apparatus such as a car stereo apparatus, and more particularly to an interface between an operation and display unit and a main body unit in such an on-vehicle electronic apparatus.

2. Description of the Related Art

There are two types of car stereo apparatuses. Namely, one type is fixedly mounted in a cockpit of a vehicle. The other type is detachably mounted on the vehicle i.e., installed to the vehicle in such a manner to be easily detached and attached by the owner (user) of the vehicle. The reason why it is detachably mounted is to detach the electronic apparatus as a crime prevention when the owner is away from his vehicle.

As a method of detaching and attaching this type of car stereo apparatus, there is a partially detachable method of detaching only the major portion of the car stereo apparatus, and a whole detachable method of detaching the whole car stereo apparatus from the cockpit. Hereinbelow, the partially detachable method will be explained.

In the partially detachable method, the operation panel is detachably mounted on the front of the cabinet. After the operation panel which is the major portion of the car stereo apparatus is detached, it cannot function as a car stereo apparatus anymore. Thus, the crime prevention is enabled.

The main body unit is included in the cabinet, and is fixedly mounted with respect to the vehicle body. The main body unit may be provided with a main body side microcomputer, an oscillator, audio equipments and so on. The main body side microcomputer controls transmission and reception of various signals. The oscillator generates a clock. The audio equipments may be a tape deck circuit and a tuning circuit for achieving a synchronization of the tuner, for example.

On the other hand, the operation panel may be provided with a LCD (Liquid Crystal Display) microcomputer, a LCD device, a key input unit disposed at the front of the operation panel, a light receiving unit for remote control by infrared ray and so on. The LCD microcomputer receives the input from the key input unit and the light receiving unit for remote control, transmits the key input to the main body side microcomputer, receives the display data transmitted from the main body side microcomputer, and drives an internal LCD driver to display it on the LCD device.

The LCD microcomputer and the main body side microcomputer are connected to each other by five transmission lines i.e. a clock line, a data line, a chip select line, a busy line and a key line.

The clock line is a line for transmitting the clock, which is generated by the oscillator, from the main body side microcomputer to the LCD microcomputer. The data line is a line for transmitting the data, which indicates the display content, from the main body side microcomputer to the LCD microcomputer. The chip select line is a line for transmitting a chip select control signal, which controls the chip selection in the LCD microcomputer, from the main body side microcomputer to the LCD microcomputer. The busy line is a line for transmitting a signal, which indicates the LCD microcomputer is in a status to prohibit the display data reception of the LCD microcomputer, from the LCD microcomputer to the main body side microcomputer. The key line is a line for transmitting the key data, which is inputted from the key input unit, from the LCD microcomputer to the main body side microcomputer.

In this manner, there are required at least five transmission lines in case of the above mentioned car stereo apparatus, in which the operation panel is detachable from the main body unit.

However, in this kind of car stereo apparatus, metal contacts are required to transmit and receive the electrical signals between the operation panel and the main body unit. Thus, noises such as a pulse are generated by the vehicle vibration and by the change in conditions between contact and non-contact at the metal contacts when the operation panel is detached and attached. If there is generated such a noise during the signal transmission, the transmitted signal is destroyed.

For example, the display data, which are transmitted from the main body side microcomputer to the LCD microcomputer on the operation panel side through the clock line, the data line and the chip selection line, are transmitted by a clock type serial transmission. Accordingly, when the noise (e.g. a small pulse) enters the clock line, since the LCD microcomputer erroneously counts this noise as one clock, the LCD microcomputer receives erroneous data as a result. On the other hand, since the transmission method of the key data is the PWM (Pulse Width Modulation) method, when the noise is generated in this case, the erroneous count is generated and erroneous data is also taken in.

Especially, in case of the car stereo apparatus in which the operation panel can be detached from the main body unit, since there are required at least five transmission lines, the possibility to generate the noise due to the contact and non-contact at the metal contacts is high.

SUMMARY OF THE INVENTION

It is therefore an object of the present invention to provide an on-vehicle electronic apparatus, in which the operation and display unit can be detached from the main body unit, and which can reduce the generation of the noise in the data transmission and can prevent the erroneous data from being taken in.

The above object of the present invention can be achieved by an on-vehicle electronic apparatus provided with: a main body unit fixed with respect to a vehicle and having a first clock generation device for generating a clock for synchronization in the main body unit, a first shift register for taking in data and a first controller for controlling transmission and reception of the data at the main body unit; and an operation and display unit detachably mounted on the main body unit and having a second clock generation device for generating a clock for synchronization in the operation and display unit, a second shift register for taking in data and a second controller for controlling transmission and reception of the data at the operation and display unit, wherein the transmission and reception of the data between the main body unit and the operation and display unit are established through just two transmission lines, one of which is for transmission from the operation and display unit to the main body unit and the other of which is for transmission from the main body unit to the operation and display unit.

According to the construction of the present invention, each of the main body unit and the operation and display unit has: the clock generation device for generating the clock for synchronization; the shift register for taking-in the data; and the controller for controlling the transmission and reception of the data. Thus, the transmission and reception of the data between the main body unit and the operation and display unit, can be established through just two transmission lines, one of which is for transmission from the operation and display unit to the main body unit and the other of which is for transmission from the main body unit to the operation and display unit. Accordingly, the number of the metal contacts between the main body unit and the operation and display unit can be reduced, the generation of the noise in the data transmission can be reduced, and the reliability in transmission can be improved.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

Figure 1:
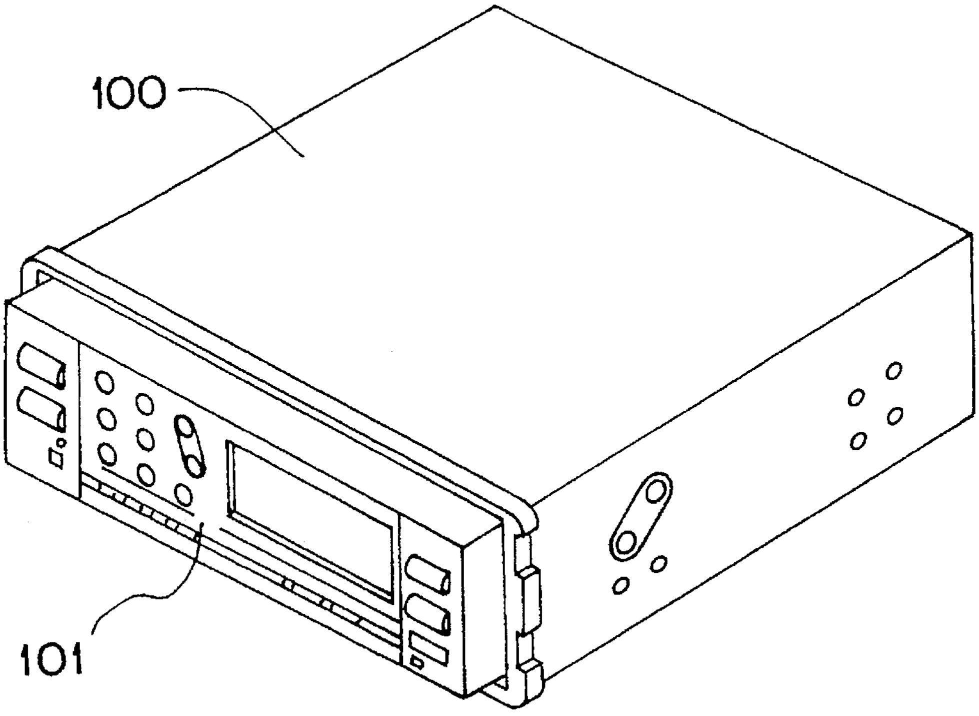
FIG. 1 is a perspective view of an on-vehicle electronic apparatus of an embodiment of the present invention, in one state.
Figure 2:
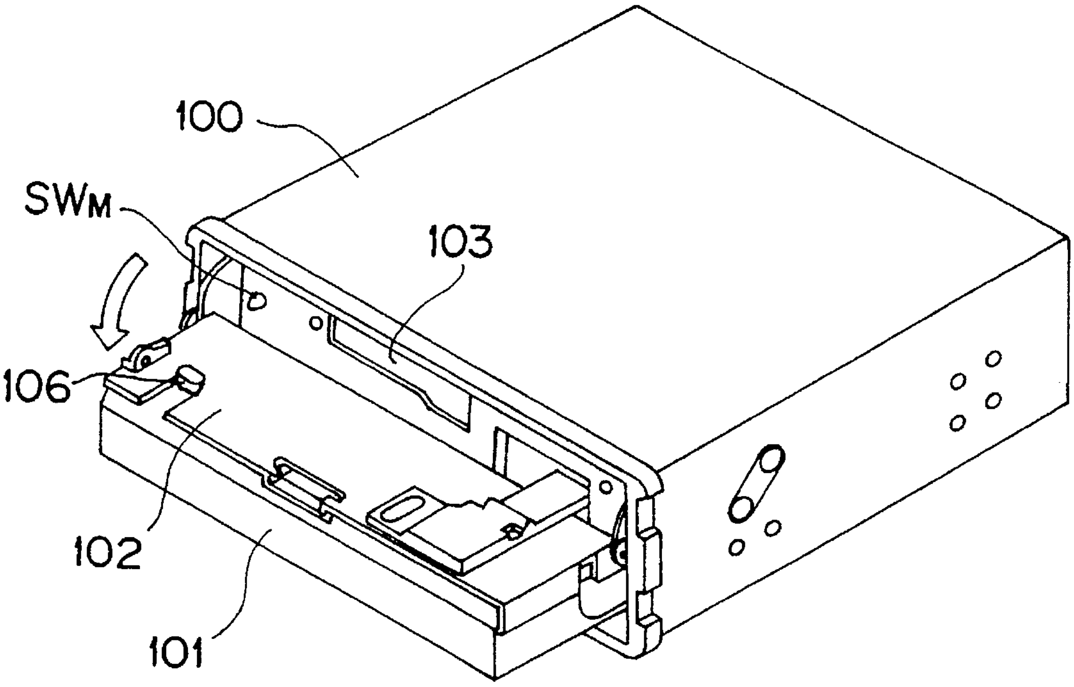
FIG. 2 is a perspective view of the on-vehicle electronic apparatus of the embodiment, in another state.
Figure 3:
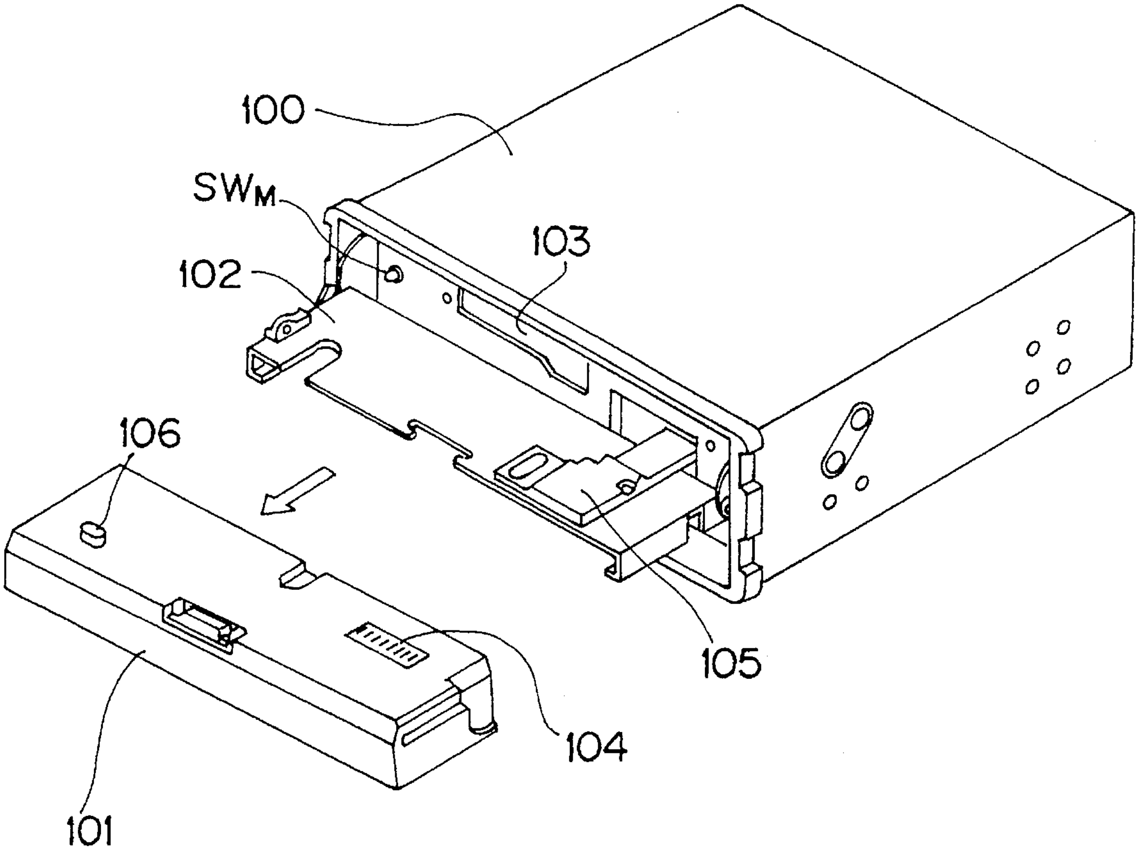
FIG. 3 is a perspective view of the on-vehicle electronic apparatus of the embodiment, in another state.

FIGS. 1 to 3 show different states of an on-vehicle electronic apparatus of partially detachable type, which is a car stereo apparatus, as an embodiment of the present invention.

As shown in FIG. 1, the on-vehicle electronic apparatus is provided with a cabinet 100 and an operation panel 101. The cabinet 100 includes a main body unit and fixed with respect to the body of the vehicle. The operation panel 101 includes an operation and display unit and is detachably set at the front of the cabinet 100 so as to operate as a car stereo apparatus.

As shown in FIG. 2, the operation panel 101 at the front of the cabinet 100 is detachably supported by an internal lid 102, which is swingably connected to be opened and closed at the front of the cabinet 100. When the operation panel 101 is to be detached, the operation panel 101 is opened together with the internal lid 102, so that only the operation panel 101 can be detached, as shown in FIG. 3. A mechanical switch $SW_M$ is provided at the front surface of the cabinet 100 at such a position that a protrude portion 106 of the operation panel 101 abuts and presses the mechanical switch $SW_M$ to indicate the operation panel 101 is properly set when the operation panel 101 is closed with the internal lid 102. In FIGS. 2 and 3, a reference numeral 103 denotes an opening for inserting a cassette tape, a reference numeral 104 denotes a terminal portion for the metal contact on the operation panel side, and a reference numeral 105 denotes a terminal portion for the metal contact on the main body side.

After detaching the operation panel 101 which is the major portion of the car stereo apparatus, the on-vehicle electronic apparatus cannot function as a car stereo apparatus anymore. Thus, the crime prevention is enabled in the present embodiment shown in FIGS. 1 to 3.

Figure 4:
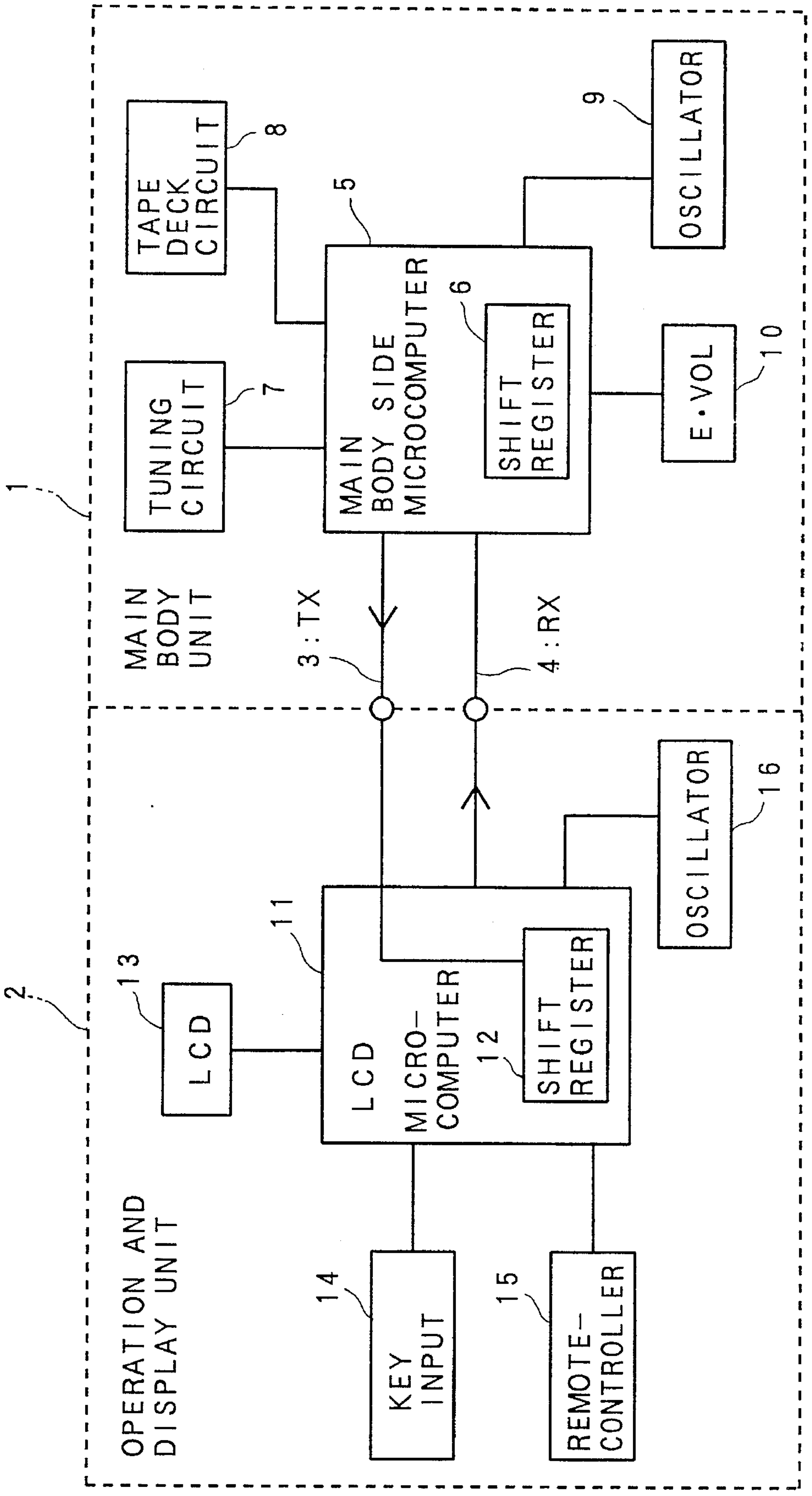
FIG. 4 is a block diagram of a circuit construction of the on-vehicle electronic apparatus of the embodiment.

FIG. 4 is a block diagram of a circuit construction of the on-vehicle electronic apparatus, which is the car stereo apparatus, of the embodiment.

In FIG. 4, the on-vehicle electronic apparatus is provided with a main body unit 1, which is included in the cabinet 100 of FIG. 1, and an operation and display unit 2, which is included in the operation panel 101 of FIG. 1. The main body unit 1 is provided with: a main body side microcomputer 5 for controlling transmission and reception of. various signals; a tuning circuit 7 for achieve the synchronization of a tuner; a tape deck circuit 8 for perform a tape reproduction; an oscillator 9 for generating a clock; and a constant electric voltage source (E. VOL) 10. The operation and display unit 2 is provided with: a LCD microcomputer 11; a LCD 13; a key input unit 14; a remote controller 15 for receiving an infrared ray; and an oscillator 16. Here, the LCD microcomputer 11 receives the input from the key input unit 14 and the remote controller 15, which are disposed at the front of the grill portion, and transmits the key code of the inputted key to the main body side microcomputer 5. The LCD microcomputer 11 receives the display data transmitted from the main body side microcomputer 5, and drives an internal LCD driver to perform a display on the LCD device 13. The main body side microcomputer 5 in the main body unit 1 is provided with a shift register 6 for taking in the data from the LCD microcomputer 11 in the operation and display unit 2 through a transmission line RX4. The LCD microcomputer 11 in the operation and display unit 2 is provided with a shift register 12 for taking in the data from the main body side microcomputer 5 in the main body unit 1 through a transmission line TX3.

In this manner, the main body unit 1 and the operation and display unit 2 are provided with the oscillators 9 and 16 respectively, and the shift registers 6 and 12 respectively. Between the main body unit 1 and the operation and display unit 2 are connected by two transmission lines i.e. the transmission lines TX3 and RX4 through metal contacts. In the asynchronous data transmission method of the present embodiment, in place of the metal contact technique, non-contact technique by means of a diode for infrared ray for example, may be employed.

Nextly, the operation of the on-vehicle electronic apparatus (i.e. the car stereo apparatus) of FIG. 4 will be explained. Firstly, when the user presses the key of the key input apparatus, the LCD microcomputer 11 receives the key data and encodes the received key data. This key code is supplied to the main body side microcomputer 5 through the transmission line RX4. When the main body side microcomputer 5 receives the key code, it decodes the received key code and performs processing in accordance with the content of the key. For example, when the key for rewinding the cassette of the key input unit 14 is pressed, the main body side microcomputer 5 controls the tape deck circuit 8 to put it in the rewinding status. The display data indicating this cassette rewinding status is transmitted to the LCD microcomputer 11 through the transmission line TX3. In this manner, the data transmission between the main body unit 1 and the operation and display unit 2 is performed by the synchronization data transmission method by use of only two transmission lines i.e. the transmission lines TX3 and RX4. The more concrete transmission manner will be explained later.

Figure 5:
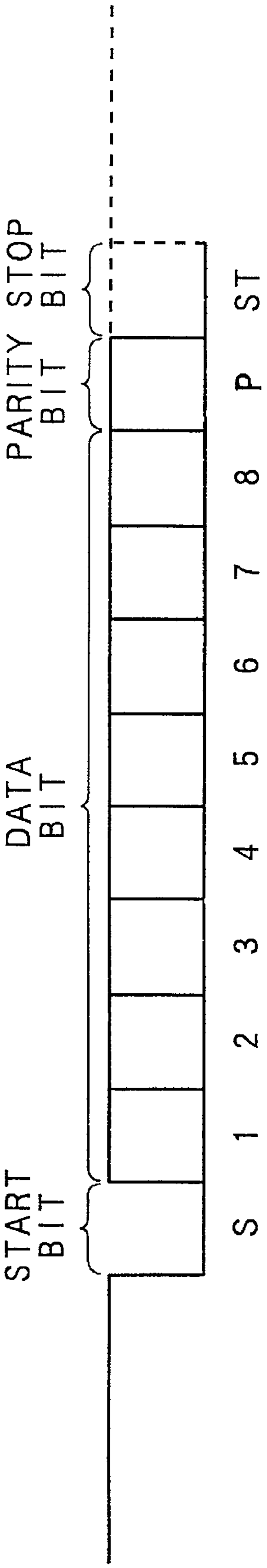
FIG. 5 is a timing chart in an asynchronous data transmissions operation of the embodiment.

FIG. 5 is a timing chart in the asynchronous data transmission operation of the embodiment. As shown in FIG. 5, in the asynchronous data transmission method, a start bit S and a stop bit ST are inserted to the position before and after the arrangement of data bits 1 to 9 and a parity bit P respectively, as the asynchronous information. In the timing chart of FIG. 5, a parity bit P for parity check is inserted between the data bit 8 and the stop bit ST. In the asynchronous data transmission, the transmission rate is constant, and the transmission side does not send the synchronization information while the receiving side detects the end of the bit on the basis of the bit clock on the receiving side.

Figure 6:
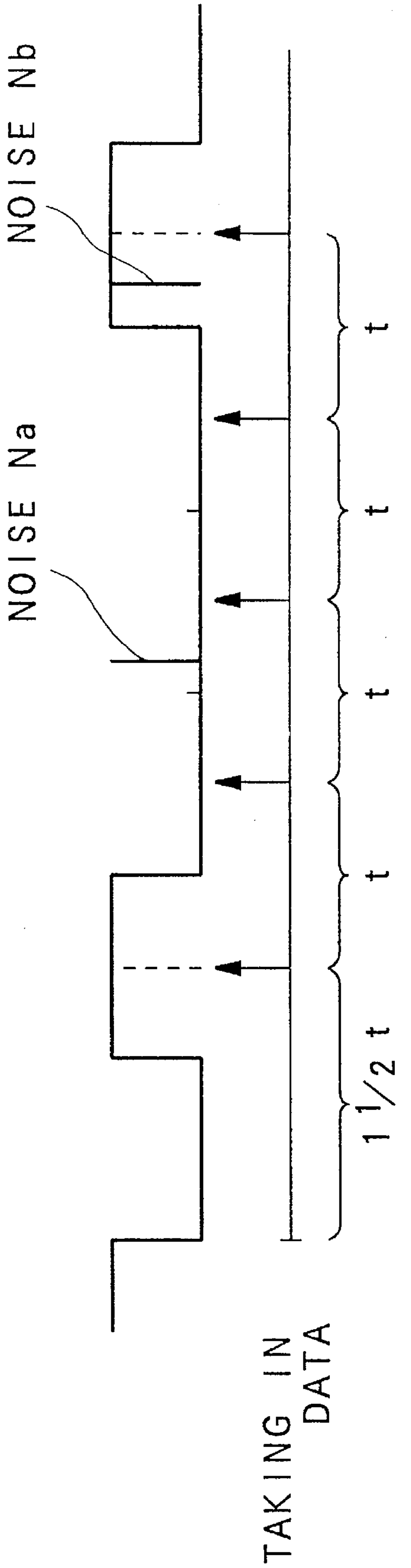
FIG. 6 is a timing chart in an operation of taking-in data in the asynchronous data transmission operation of the embodiment.

FIG. 6 is a timing chart in an operation of taking-in data in the asynchronous data transmission operation of the embodiment. In the asynchronous data transmission method, the internal timer is started by use of the fall down of the start bit as a trigger signal and the data at the vicinity of the center of data bits 1 to 8, on the receiving side. Therefore, if a noise Na or Nb (e.g. external disturbance pulse) is not taken in at the time of taking in the data as indicated by an arrow in FIG. 6, the right data can be read so that the reliability of reading the data can be improved.

Since there is the parity bit P, even if the data is destroyed by a noise at the time of taking in the data, the parity check is possible so that the reliability of taking in the data can be further improved.

Figure 7:
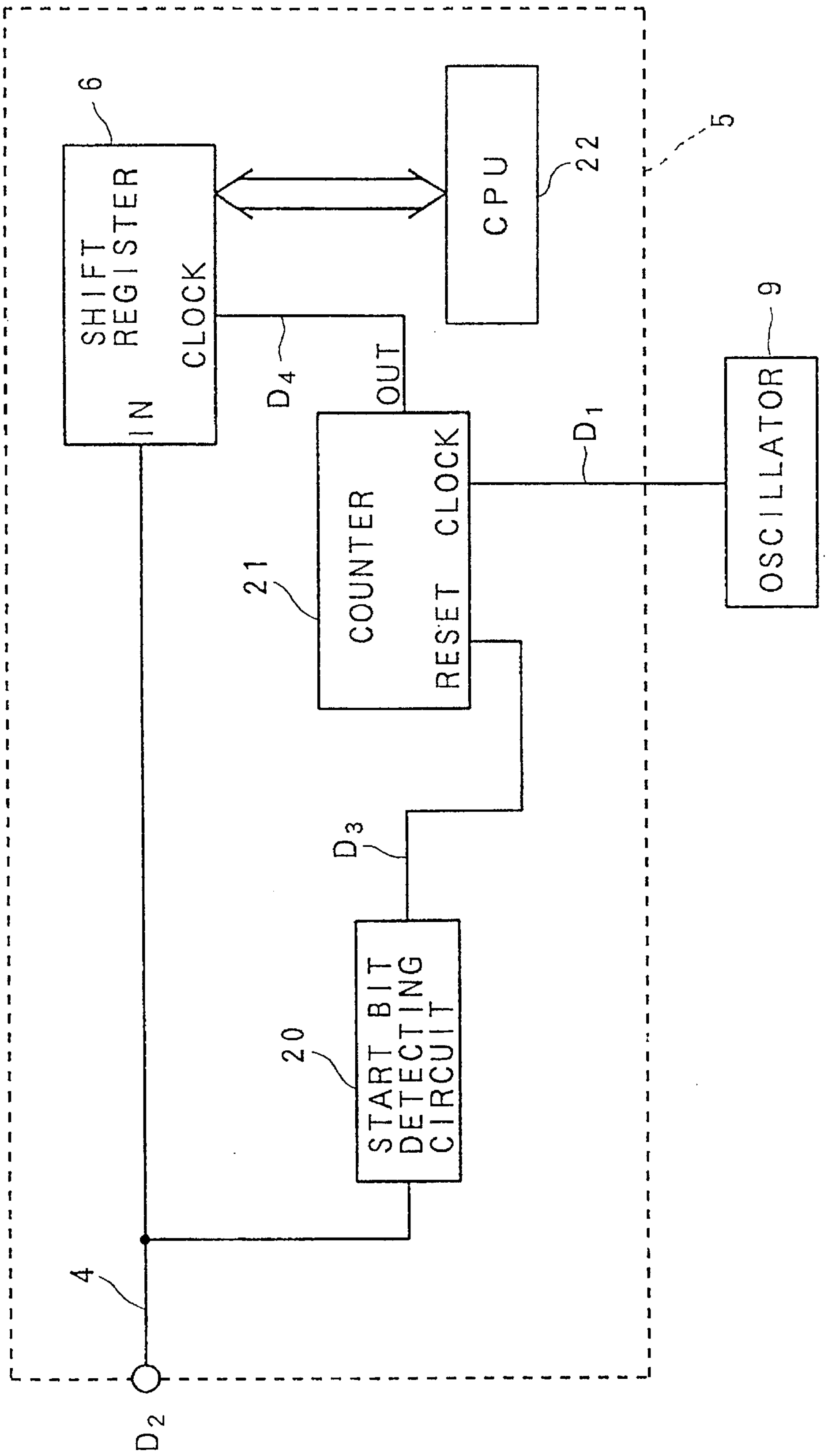
FIG. 7 is a block diagram of a circuit for generating a bit clock in the embodiment.

Nextly, with referring to FIG. 7 and FIGS. 8A–D, the data transmission between the main body unit 1 and the operation and display unit 2, will be explained. FIG. 7 shows a circuit for generating a bit clock in the embodiment, and FIGS. 8A–D shows, a timing chart of the circuit for generating the bit clock. Data D1 to D4 in FIG. 7 correspond to the data D1 to D4 in FIGS. 8A–D, respectively.

For the simplicity of the explanation below, FIG. 7 shows a case where the data shown in FIG. 5 (which corresponds to the data D2 in FIG. 7) is supplied to the main body side microcomputer 5 from the LCD microcomputer 11 through the transmission line RX4 in FIG. 4.

The circuit for generating the bit clock shown in FIG. 7 is provided with an oscillator 9, a start bit detecting circuit 20 and a counter 21.

Figures 8A, 8B, 8C, 8D:
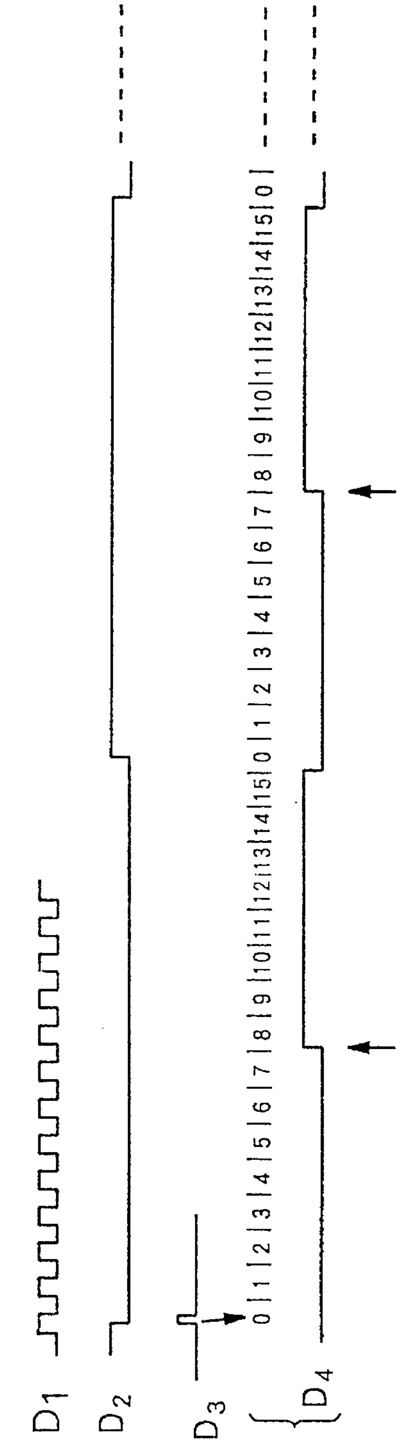
FIGS. 8A–D are timing charts of the circuit for generating the bit clock of FIG. 4.

Nextly, the operation of the circuit shown in FIG. 7 is explained. In case of the circuit of FIG. 7, the data D2 is supplied to the input terminal IN of the shift register 6 and the input terminal of the start bit detecting circuit 20 through the transmission line RX4. When the start bit detecting circuit 20 detects the start bit of the data D2, it supplies the start bit detection signal D3 to the reset input terminal of the counter 21. When the start bit detection signal D3 is supplied to the reset terminal of the counter 21, the counter 21 is reset. On the other hand, the oscillation clock data D1 generated by the oscillator 9, is supplied to the clock input terminal of the counter 21. Here, as the oscillation clock data D1 generated by the oscillator 9, a clock which is 16 times of the transmission speed (rate) is utilized. The counter 21 generates the bit clock data D4 out of the oscillation clock D1 supplied from the oscillator 9 and the start bit detection signal D3 supplied from the start bit detecting circuit 20, and supplies it to the clock input terminal of the shift register 6. In the asynchronous data transmission, the character asynchronous is achieved by the start bit, and the bit asynchronous information is not supplied from the transmitting side. The receiving side measures the time by use of the internal oscillator after detecting the start of the character by the start bit, and judges the end of the bit. The shift register 6 takes in the data D2 supplied to the input terminal at the time of rising up of the bit clock D4 supplied to the clock input terminal as shown in FIG. 8D. The CPU 22 controls the operation of each control object (e.g. the tuning circuit 7, the tape deck circuit 8 of FIG. 4) on the basis of the data taken into the shift register 6.

The above explanation related to FIGS. 7 and 8A–D, is also valid in the same manner as for the case where the data shown in FIG. 5 (which correspond to the data D2 of FIG. 7) is supplied from the main body side microcomputer 5 to the LCD microcomputer 5 through the transmission line TX3 of FIG. 1.

As described above in detail, according to the present embodiment, since the data transmission is performed by use of the asynchronous data transmission method between the operation and display unit and the main body unit, the number of the transmission lines between the operation and display unit and the main body unit i.e., the number of the metal contacts, can be diminished. Thus, the contact noise can be diminished and the reliability can be improved. Further, since the number of the transmission lines can be diminished, the cost down can be promoted.

Furthermore, in case of the asynchronous serial transmission, since the transmission error check such as a parity error check, a frame error check, and an overrun error check is performed by hardware, the design of the software is rather easily performed. In the asynchronous serial data transmission, since the shift registers for reception and for transmission are independent from each other, the transmission and reception can be independently performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An on-vehicle electronic apparatus comprising:

a main body unit fixed with respect to a vehicle and having a first clock generation means for generating a clock for synchronization in said main body unit, a first shift register for taking in data and a first controller for controlling transmission and reception of the data at said main body unit; and an operation and display unit detachably mounted on said main body unit and having a second clock generation means for generating a clock for synchronization in said operation and display unit, a second shift register for taking in data and a second controller for controlling transmission and reception of the data at said operation and display unit, wherein the transmission and reception of the data between said main body unit and said operation and display unit are established through just two transmission lines, one of which is for transmission from the operation and display unit to the main body unit and the other of which is for transmission from the main body unit to the operation and display unit.

2. An on-vehicle electronic apparatus according to claim 1, wherein the transmission and reception of the data between said main body unit and said operation and display unit are established by asynchronous data transmission in which clock signals from said first and second clocks are not transmitted, and in which a start bit and a stop bit are transmitted in said data as synchronization information.

3. An on-vehicle electronic apparatus according to claim 1, wherein the operation and display unit is detachably supported by an internal lid, which is swingably connected to be opened and closed at the front of said main body unit.

4. An on-vehicle electronic apparatus according to claim 1, wherein said operation and display unit further has a LCD device for displaying the data.

5. An on-vehicle electronic apparatus according to claim 1, wherein said operation and display unit further has a key input unit for inputting key data.

6. An on-vehicle electronic apparatus according to claim 1, wherein said main body unit further has a tuning circuit and a tape deck circuit.

7. An on-vehicle electronic apparatus according to claim 1, wherein the two transmission lines connect the operation and display unit and the main body unit to each other by use of a metal contact technique.

8. An on-vehicle electronic apparatus according to claim 1, wherein a display data indicating a status in the main body unit is transmitted from said main body unit to the operation and display unit through said other transmission line.

9. An on-vehicle electronic apparatus according to claim 1, wherein each of said first and second controllers performs one of a parity error check, a frame error check and an overrun error check.

10. An on-vehicle electronic apparatus according to claim 1, wherein each of said main body unit and said operation and display unit further has a start bit detecting circuit for detecting a start of a bit data received through the transmission lines, and a counter for counting the generated clock on the basis of the detected start of the received bit data.

11. An on-vehicle electronic apparatus according to claim 10, wherein each of said first and second controllers judges the end of the bit data by use of rising up or falling down of the received bit data.

* * * * *